United States Patent [19]

Bawden et al.

[11] Patent Number: 6,003,077
[45] Date of Patent: Dec. 14, 1999

[54] COMPUTER NETWORK SYSTEM AND METHOD USING DOMAIN NAME SYSTEM TO LOCATE MIB MODULE SPECIFICATION AND WEB BROWSER FOR MANAGING SNMP AGENTS

[75] Inventors: Alan Bawden, Cambridge; Shawn A. Routhier, Northboro; S. Robert Austein, Reading; Lowell S. Gilbert, Burlington, all of Mass.

[73] Assignee: Integrated Systems, Inc., Sunnyvale, Calif.

[21] Appl. No.: 08/929,633

[22] Filed: Sep. 15, 1997

Related U.S. Application Data

[60] Provisional application No. 60/026,204, Sep. 16, 1996.
[51] Int. Cl.⁶ .................................................. G06F 13/00
[52] U.S. Cl. ............................................. 709/223; 709/224
[58] Field of Search ................................. 707/10; 705/8; 709/223, 224

[56] References Cited

U.S. PATENT DOCUMENTS

| | | | |
|---|---|---|---|
| 5,619,615 | 4/1997 | Pitchaikani et al. | 395/11 |
| 5,682,482 | 10/1997 | Burt et al. | 395/242 |
| 5,710,908 | 1/1998 | Man | 395/500 |
| 5,729,689 | 3/1998 | Allard et al. | 395/200.58 |
| 5,742,762 | 4/1998 | Scholl et al. | 395/200.3 |
| 5,761,663 | 6/1998 | Lagarde et al. | 707/10 |
| 5,826,239 | 10/1998 | Du et al. | 705/8 |

*Primary Examiner*—Le Hien Luu
*Attorney, Agent, or Firm*—Pennie & Edmonds, LLP

[57] ABSTRACT

A standard SNMP management station is replaced by a client computer having a standard Web browser while utilizing the services of a Web/SNMP proxy agent in accordance with the present invention. The Internet locations of the ASN.1 specifications for various MIB modules, as well as other information resources associated with those MIB modules, are stored in resource records in a section of the DNS established for storing such information. The Web/SNMP proxy agent automatically locates the ASN.1 specification for each MIB module of any identified SNMP agent, by looking up the location in the DNS. The Web/SNMP proxy agent then compiles the ASN.1 MIB module specifications into HTML documents for viewing on the client computer. User requests for retrieving data from specified MIB objects and/or for sending data values to specified MIB objects are communicated from the client computer to the Web/SNMP proxy agent using standard HTTUP communications. When the specified SNMP agent is remotely located from the Web/SNMP proxy agent, the Web/SNMP proxy agent converts the user requests into SNMP packets that are communicated to the specified SNMP agent. SNMP reply packets are converted into HTML documents, generally by inserting the information in the reply packets into previously generated HTML MIB specification documents, that are then communicated back to the user's client computer.

6 Claims, 5 Drawing Sheets

COMPUTER NETWORK SYSTEM AND METHOD USING DOMAIN NAME SYSTEM TO LOCATE MIB MODULE SPECIFICATION AND WEB BROWSER FOR MANAGING SNMP AGENTS

This application claims benefit of provisional application Ser. No. 60/026,204 filed Sep. 16, 1996.

The present invention relates generally to managing networks that use SNMP agents to monitor and control network devices, and particularly to a WWW (World Wide Web) based system and method for enabling network managers to receive information from SNMP agents whose internal structure is not known in advance.

BACKGROUND OF THE INVENTION

SNMP (Simple Network Management Protocol) was developed to provide a tool for multivendor, interoperable network management. SNMP provides a set of standards for network management, including a protocol, a database structure specification, and a set of data objects. SNMP was adopted as the standard for TCP/IP-based internets in 1989.

An explanation of SNMP technology is beyond the scope of this document and the reader is assumed to be either conversant with SNMP or to have access to conventional textbooks on the subject, such as William Stallings, "SNMP, SNMPv2 and RMON," Addison Wesley (1996), which is hereby incorporated by reference in its entirety as background information.

When a network management station first encounters a SNMP-manageable device, it is fairly easy for the management station to obtain a dump of all the MIB (Management Information Base) objects supported by that device's SNMP agent, simply by walking through the agent's MIB with GET-NEXT or GET-BULK PDUs. Unfortunately, the information that the management station can obtain in this way is nearly useless without additional resources that are not usually available from the SNMP agent. The most obvious example of such a resource is the ASN.1 specification of the MIB module that contains the objects in question: without the ASN.1 specification, most of the contents of most MIB modules are just collections of unlabeled integers. Other useful resources might be a human-readable specification of the MIB module (such as an RFC document in the case of an IETF Standards track MIB), or specialized executable code to perform higher-level management of the object.

At present, these additional resources must be provided via external means, usually by tracking down floppy disks or anonymous FTP sites, and then manually configuring the management station to use the additional resources.

It is a goal of the present invention to greatly simply and facilitate the management of remotely located, SNMP-manageable devices, even when the structure of the MIB modules for the device's SNMP agent is not known to the user or the user's management station.

It is also a goal to enable users to communicate with the SNMP agents of SNMP-manageable devices through the use of standard WWW browsers.

SUMMARY OF THE INVENTION

In summary, the present invention is a system and method for automatically locating and utilizing the MIB module specifications for each MIB associated with an identified SNMP agent. A standard SNMP management station can be replaced by a client computer having a standard Web browser while utilizing the services of a Web/SNMP proxy agent in accordance with the present invention.

The Internet locations of the ASN.1 specifications for various MIB modules, as well as other information resources associated with those MIB modules, are stored in resource records in a section of the DNS established for storing such information. The Web/SNMP proxy agent automatically locates the ASN.1 specification for each MIB module of any identified SNMP agent, by looking up the location in the DNS. The Web/SNMP proxy agent then compiles the ASN.1 MIB module specifications into HTML documents for viewing on the client computer. User requests for retrieving data from specified MIB objects and/or for sending data values to specified MIB objects are communicated from the client computer to the Web/SNMP proxy agent using standard HTTP communications. When the specified SNMP agent is remotely located from the Web/SNMP proxy agent, the Web/SNMP proxy agent converts the user requests into SNMP packets that are communicated to the specified SNMP agent. SNMP reply packets are converted into HTML documents, generally by inserting the information in the reply packets into previously generated HTML MIB specification documents, that are then communicated back to the user's client computer.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

Figure 1:
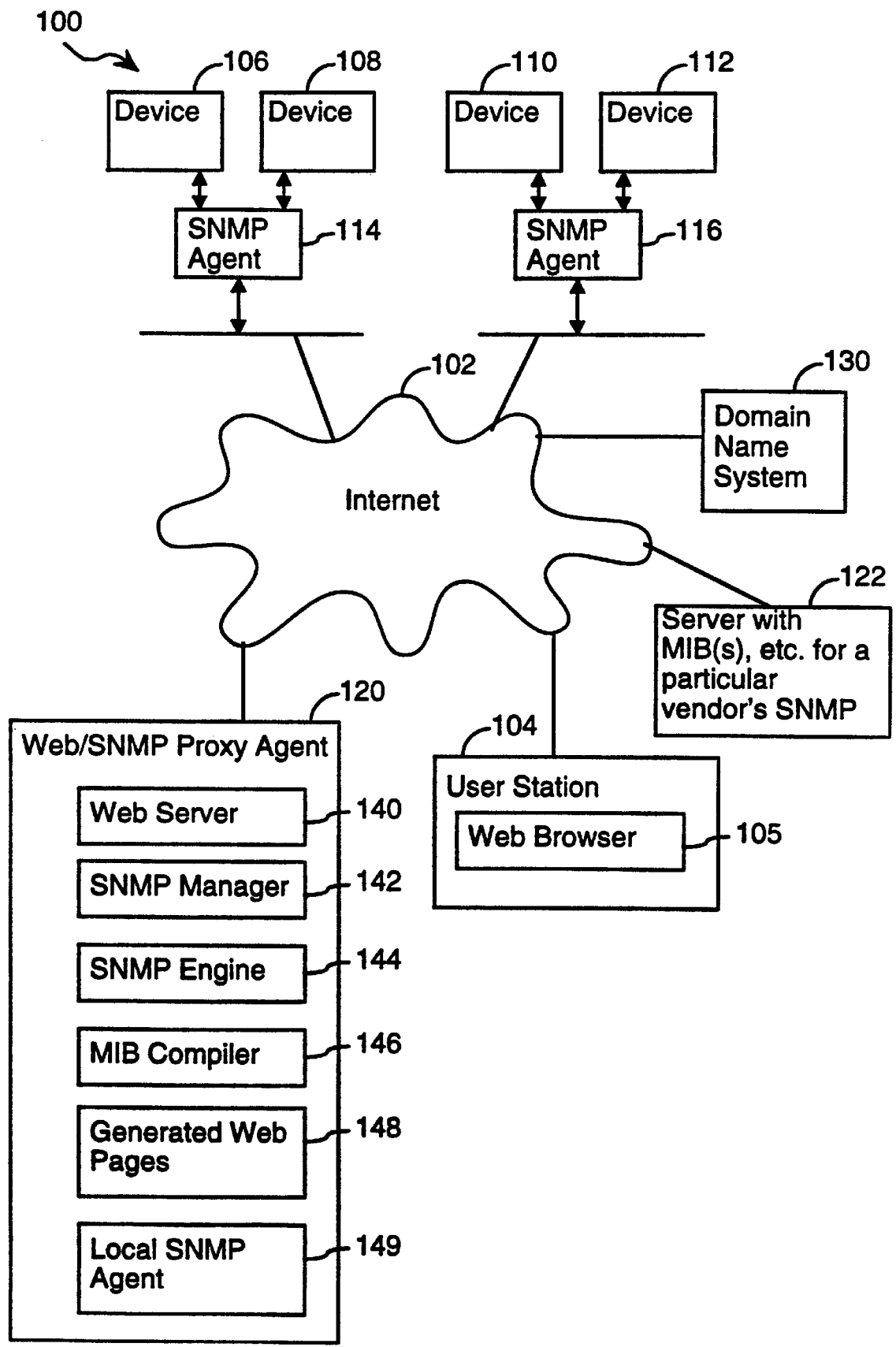
FIG. 1 is a block diagram of a distributed computer system utilizing the Web-proxy agent of the present invention.

Referring to FIG. 1, there is shown a distributed data processing system 100 with numerous network nodes or devices interconnected by a variety of network communication media including the communication media in the Internet 102. Only the devices relevant to a preferred embodiment of the present invention are shown. In particular, the system includes one or more user stations 104, sometimes called a client computers or workstations, each equipped with a World Wide Web browser (hereinafter called a "WWW browser" or "Web browser") that enables the user of the client workstation 104 to view HTML (hypertext markup language) documents and to dynamically connect to network devices by way of the Web.

Various network or computer devices 106, 108, 110, 112 are managed by corresponding SNMP agents 114,116 that are Internet accessible. A Web/SNMP proxy agent 120, which provides the core elements of the present invention, functions in part like an SNMP proxy agent while also providing Web server services for facilitating Web browser based communication with SNMP agents.

In addition, the system includes information servers 122 that store vendor specific information about the object data structures associated with various SNMP agents, and a domain name system (DNS) 130 that stores information helpful for locating Internet accessible resources.

It should be understood that the SNMP agents 114, 116, the DNS 130, the information server 122, and the user station 104 with a Web browser are all devices that predate the present invention. The present invention supplements those pre-existing devices, and in the case of the DNS 130 it adds to the information stored by that device, to facilitate network management of SNMP-manageable devices.

The information about a device that is accessible using an SNMP agent is organized in a tree data structure. The information associated with an SNMP agent is organized as one or more MIB modules, each of which contains many objects, each representing data about the device. Every object in a MIB module has a unique object identifier, which is defined by the position of the object in the tree-structured MIB module. That is, the tree path to any particular set of information in the MIB tree data structure is called an object identifier (OID). The tree paths are generally denoted as a sequence of integers separated by periods. Object IDs are represented in "big endian" format, with the most significant portions of the ID at the left. Thus, in the object identifier 1.3.6.1.2.1.6.13.1.1 the leftmost "1" represents a first branch in the tree, the "3" represents a next branch in the tree, and so on.

The integer values for the paths in the upper portions of the SNMP tree are assigned by a central standards body called the Internet Assigned Numbers Authority (IANA). In any case, an OID such as 1.3.6.1.2.1.1.2 will generally define the type of device being managed and its manufacturer. The portions of the OID tree that are beyond those defined by the central standards body are generally those associated with specific MIB modules, and thus are defined by the manufacturers of those devices. Since there is no requirement of standardization of the portions of the OID tree within MIB modules, the data stored in such OID trees is usually meaningless without specific information about the meaning of the data stored in each of the nodes of the MIB module subtree.

Every, or virtually every, provider of SNMP agents provides a MIB module definition file, called the ASN.1 (Abstract Syntax Notation, version 1) specification of the MIB module, for every MIB module in each SNMP agent provided by that company or organization. The ASN.1 specification for a MIB module is essentially a structured description of the database schema for the MIB module, and has many similarities to a data structure statement or definition in computer languages such as the C language. The ASN.1 specification, in addition to defining the schema of the MIB module, typically includes a word or short phrase describing the meaning or function of each object (i.e., data field or collection of data fields) in the MIB module.

Most providers of SNMP agents also provide a "defining standard document" for each MIB module. The defining standard document is a human-readable document version of the MIB module specification that usually provides explanations concerning the operation of the MIB module.

In accordance with the present invention, for each and every MIB module of every SNMP management device that can be managed using the present invention, the ASN.1 specification of each MIB module is stored at an Internet accessible location, such as on information server 122. In addition, whenever possible, the corresponding defining standards document is also stored at an Internet accessible location. If the ASN.1 specification for a MIB module is not at an Internet accessible location, or its Internet location is not known to the provider of SNMP proxy services using the present invention, then the operation of the present invention will be inhibited with respect to that particular MIB module. In other words, a system utilizing the present invention will not be able to provide object identification and management services for such MIB modules beyond those available prior to the present invention.

From another viewpoint, the OID (object identifier) name space for all MIB modules constitutes a tree-structured delegated database. The portions of the database that cross MIB module boundaries tend to be fairly close to the root of the OID tree. The OID name space also includes many subtrees specific to particular MIB modules.

Figure 2:
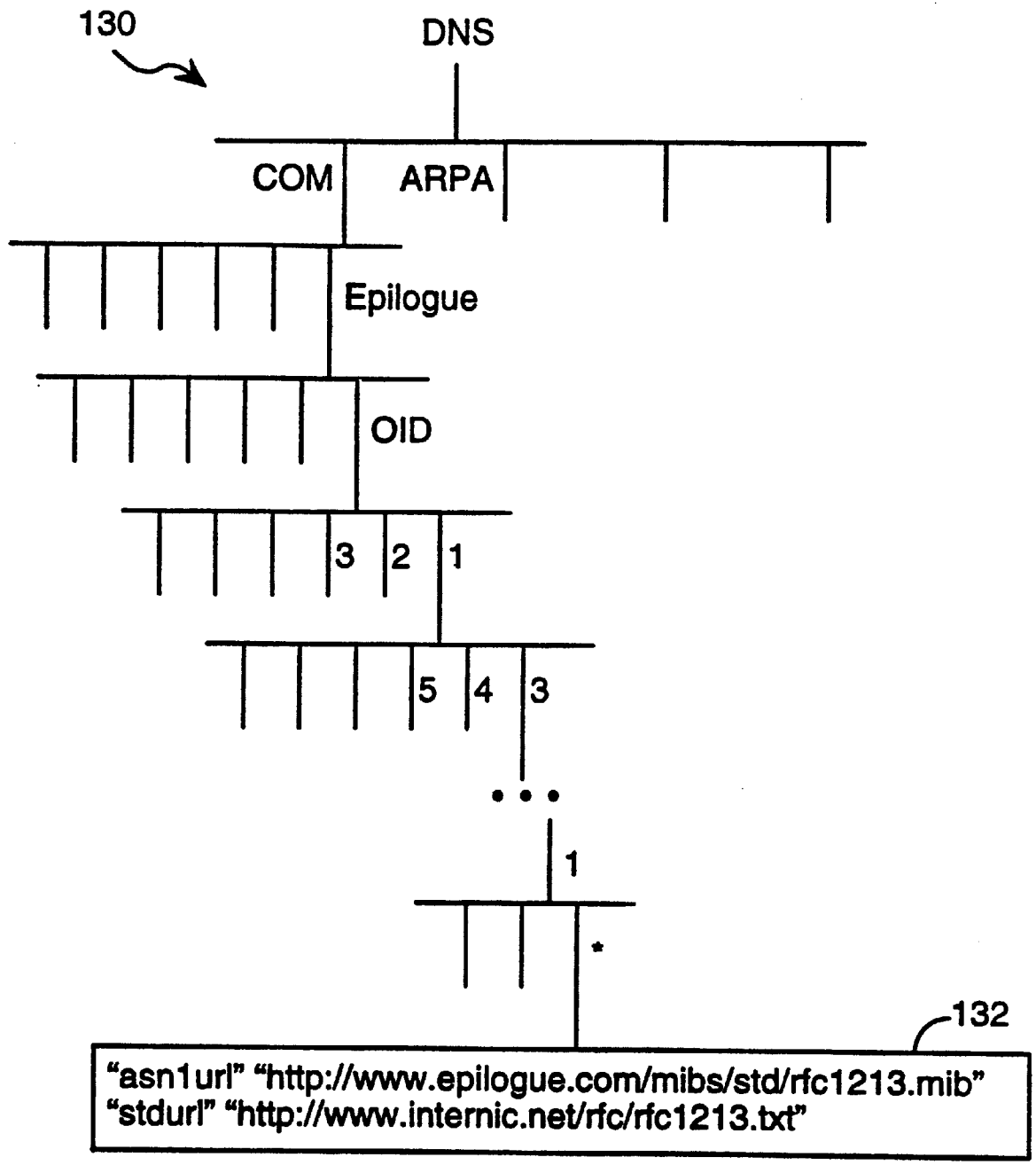
FIG. 2 depicts the structure of the Domain Name System, as utilized by a preferred embodiment of the present invention.

Referring to FIG. 2, the DNS 130 is also a delegated tree-structured database, with client query software installed on every conforming Internet host. The DNS stores a resource record (RR) for each leaf node in the DNS database. Each resource record typically stores information suitable for locating information or resources associated with a specified DNS name.

The present invention provides a mechanism for (A) mapping an MIB object ID into a DNS name, and (B) for using the constructed DNS name to obtain the Internet location of the ASN.1 specification for the associated MIB module, as well as the Internet location of other associated resources, if available. Internet locations are generally represented as URLs (universal resource locators).

In accordance with a preferred embodiment, a MIB module object ID of the form A.B.C.D.E.F.G.H, where each value in the object ID string is typically an integer, is converted into a DNS name of the form H.G.F.E.D.C.B.A.oidtreebase by reversing the order of the object ID elements and appending a standard suffix (represented above by "oidtreebase"). In the above example, "oidtreebase" represents a DNS base tree string, such as "oid.epilogue.com", that uniquely identifies a portion of the DNS name space used for identifying the location of MIB module resources. DNS names are represented in "little endian" format, with the most significant portions of the name at the right end of the DNS name. To give a concrete example, the DNS name corresponding to a MIB module object ID of 1.3.6.1.2.1.6.13.1.1 would be 1 .1. 13.6.1.2.1.6.3.1.oid.epilogue.com.

Since each MIB module may have dozens or hundreds of different objects, it would riot be practical to include a separate DNS resource record (RR) for every object of every known MIB module. Instead, DNS wildcard RRs 132 are used. As explained in RFC-1034 section 4.3.3:

> Wildcard RRs can be thought of as instructions for synthesizing RRs. When the appropriate conditions are met, the name server creates RRs with an owner name equal to the query name and contents taken from the wildcard RRs.

What this means is that a system implementing the present invention does not have to supply separate RRs for all object IDs of all the MIB modules serviceable using the present invention. Instead, the DNS portion of the system needs to supply only enough wildcard RRs to allow the DNS name servers to synthesize RRs for all the MID module object IDs. Since the instance portion of an object ID is always the least-significant portion of the object ID, wildcard RR synthesis will handle any possible instance identifier.

More specifically, a single wildcard RR is stored in the DNS 130 for each MIB module that is manageable using the preferred embodiment of present invention. In particular, for a MIB module whose objects all share the object ID prefix 1.3.6.1.2.1 can be serviced by a single DNS wildcard RR, represented as follows:

*.1.2.1.6.3.1.oid.epilogue.com. IN TXT
      "asn1url" "http://www.epilogue.com/mibs/std/rfc1213.mib"
      "stdurl" "http://www.intemic.net/rfc/rfc1213.txt"

The first two strings in the wildcard RR, "asn1url" and "http://www.epilogue.com/mibs/std/rfc1213.mib", indicate that the ASN.1 specification of the associated "1.3.6.1.2.1" MIB module can be found at the Internet location associated with a URL of "http://www.epilogue.com/mibs/std/rfc1213.mib". This one DNS wildcard RR applies to every object ID in the object ID under the 1.3.6.1.2.1 tree for which there isn't a more specific RR. The second two strings in the wildcard RR, "stdurl" and "http://www.intemic.net/rfc/rfc1213.txt", indicate that the "defining standard document" for the associated "1.3.6.1.2.1" MIB module can be found at the Internet location associated with a URL of "http://www.intemic.net/rfc/rfc1213.txt".

It should be noted that while the two URLs indicated above for the ASN.1 specification and the defining standard document are WWW locations, in other implementations the URLs could be specified as FTP locations or other types of Internet locations. Also, it should be noted that the wildcard RRs for various MIB modules might contain other information, such as the location of higher level software procedures for utilizing the associated MIB modules or (as will be discussed below) the location of an HTML-formatted pre-compiled MIB module specification.

Using the present invention, when a client (e.g., user station 104) encounters an SNMP agent having an object 1.3.6.1.2.1.4.21.1.9.10.0.0.0 with value 14, the definition of the object can be located by (A) constructing the associated DNS name:

0.0.0.1 0.9.1.21.4.1.2.1.6.3.1.oid.epilogue.com and requesting the associated DNS RR from any DNS name server (e.g., any Internet conforming server). The DNS name server will locate the associated wildcard RR, shown above, and will then construct and pass back to the requester an instance-specific RR:

0.0.0.10.8.1.21.4.1.2.1.6.3.1.oid.epilogue.com. IN TXT (
      "asn1url" "http://www.epilogue.com/mibs/std/rfc1213.mib"
      "stdurl" "http://www.intemic.net/rfc/rfc1213.txt"
    )

Using the received RR, the user could then look up the information necessary to determine that object 1.3.6.1.2.1.4.21.1.9.10.0.0.0 is an instance of ipRouteProto for destination 10.0.0.0 with value "bgp".

Up to this point, we have described a system in which (A) the ASN.1 specifications for various MIB modules are stored at Internet accessible locations, and (B) appropriate DNS wildcards are stored in the DNS 130 for locating the ASN.1 specifications of MIB modules as well as other information resources for the MIB modules. While these facilities, by themselves, would greatly reduce the difficulty of working with SNMP agents whose MIB modules definitions are unknown to a user, the present invention also provides additional facilities for enabling a user acting as an SNMP manager with a WWW browser to automatically incorporate the ASN.1 specification for each MIB module into a WWW-based user interface.

Figure 3:
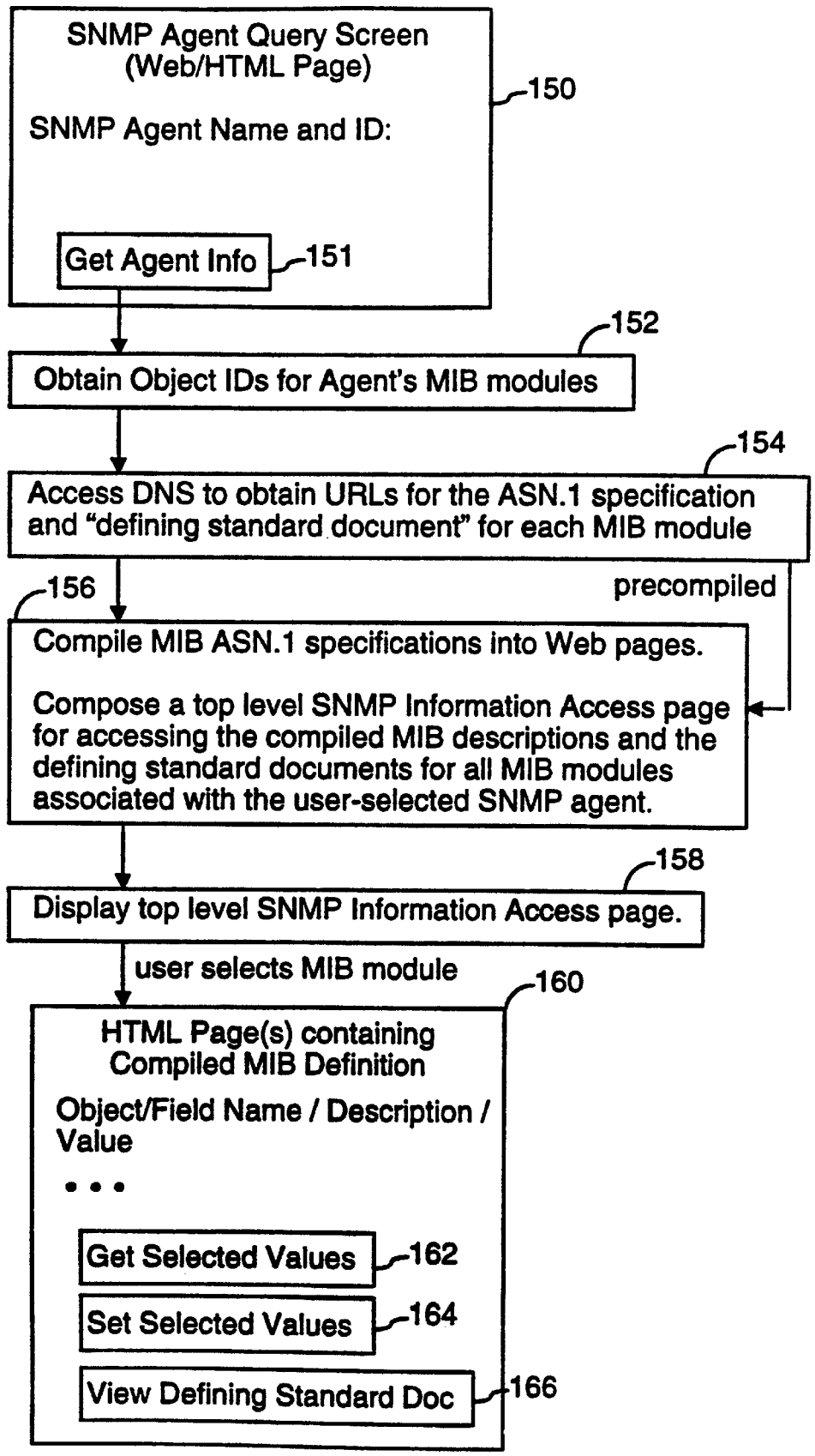
FIG. 3 is a conceptual flow chart of operation of the MIB compiler of the present invention.

Referring to FIGS. 1 and 3, the Web proxy agent 120 of the preferred embodiment includes
- a Web Server 140 for communicating with client computers 104 using WWW browsers;
- a MIB module information locator 141 for locating MIB module specifications and other information resources;
- an SNMP manager 142 for issuing SNMP management requests and receiving corresponding replies;
- an SNMP engine 144 for converting HTTP formatted user requests into SNMP request packets and for converting SNMP reply packets into HTML formatted information;
- a MIB Compiler 146 for compiling the ASN.1 specification of a specified MIB Module into an HTML page suitable for viewing the values of objects in an instance of the MIB module; and
- various Web pages (also called HTML pages) 148 generated by the MIB Compiler and SNMP engine.

In accordance with the present invention a client computer will initially access a SNMP manageable device though the use of its Web browser 105 and the Web server 140. As schematically represented in FIG. 3, when the user of the client computer accesses a particular SNMP agent (step 150) he/she can click on a "get agent info" dialog box 151 or the like so as to begin the process of accessing information about the device or devices managed by the SNMP agent by prompting the Web server 140 to build a set of Web or HTML pages for performing SNMP management functions with respect to the identified SNMP agent.

The Web server responds to the user command by obtaining the object IDs for the identified SNMP agent's MIB modules (using standard SNMP protocols) (step 152). Next (step 154) the Web server calls its MIB module information locator 141 to access the DNS to obtain the URLs for the ASN.1 specifications for the SNMP agent's MIB modules, as well as any other associated information resources denoted in the DNS wildcard resource records for those MIB modules.

Then (step 154) the Web server calls the MIB compiler 146 to compile the ASN.1 specifications for each of the specified MIB modules into corresponding Web pages. Preferably, if more than one MIB module has been compiled, the Web compiler will also generate a top level SNMP information access page for accessing the compiled MIB modules. The top level SNMP information access page is then presented to the requesting user (step 158) on the client computer's display device, and after the user selects a MIB module to access the HTML page or pages representing that compiled MIB module are displayed (step 168).

Appendix 1 of this document represents a very simple ASN.1 specification for a MIB module, and Appendix 2 represents a somewhat simplified HTML page generated by the MIB compiler 146 from compiling the ASN.1 specification in Appendix 1.

In some embodiments, no top level SNMP information access page is generated and thus step 158 is skipped. If there is more than one MIB module for the identified SNMP agent, hot links between the compiled MIB modules can be provided in the generated Web pages.

Each compiled MIB module contains a HTML formatted text representation of the hierarchical set of objects in the MIB module. In a preferred implementation, the text representation of each MIB module object is accompanied by a field for showing the data value(s) retrieved for that object and/or an HTML link to another page for viewing those data values. Each MIB module object can also be selected using standard HTML mechanisms, such as check boxes or higighghted fields. In essence, the user "fills out the form" to select objects within the MIB module whose values the user would like to see or set, and then clicks the appropriate "get" or "set" button to send in the form for processing by the Web proxy server.

In the case of read only objects and read/write objects, a "get selected values" dialog box 162 is provided for initiating retrieval of the data object values for the user selected objects. As will be described below, the Web proxy server then generates the SNMP requests for obtaining the requested data object values, and then generates an Web HTML page for displaying the retrieved data. The HTML page for displaying the retrieved data can either be a separate retrieved data display form, or it can be a version of the compiled MIB module with the retrieved data object values inserted therein.

In the case of read/write objects, the user can enter a value in the field associated one or more of those objects, followed by user selection of the "set selected value" dialog box 164. The Web proxy server then generates SNMP requests for setting the specified data object values in the corresponding MIB module of the previously specified SNMP agent.

The Web page generated by the MIB compiler for a MIB module will also preferably include HTML links 166 to any other resources denoted in the DNS wildcard resource record for the associated MIB module, such as a hot link to the defining standard document.

In a preferred embodiment, MIB module specifications for some or all of the "most popular" MIB modules can be precompiled into HTML pages and stored on various information servers, with the corresponding URLs being denoted in the respective DNS resource records. For instance, a wildcard DNS RR for a pre-compiled MIB could be represented as:

\*.1.2.1.6.3.1.oid.epilogue.com. IN TXT (

"asn1url" "http://www.epilogue.com/mibs/std/rfc1213.mib"

"stdurl" "http://www.intemic.net/rfc/rfc1213.txt"

"compurl" "http://www.epilogue.com/mibs/comp/1213.htm"

)

The "compurl" field indicates that the next field in the RR indicates the Internet location (i.e., URL) of the precompiled MIB module specification.

Whenever the Web server proxy accesses the DNS resource records (step 154) for a MIB module, and the retrieved resource record indicates the MIB module has been precompiled into an HTML page, the compilation step (156) for that MIB module is skipped and the precompiled MIB module specification is used.

Figure 4:
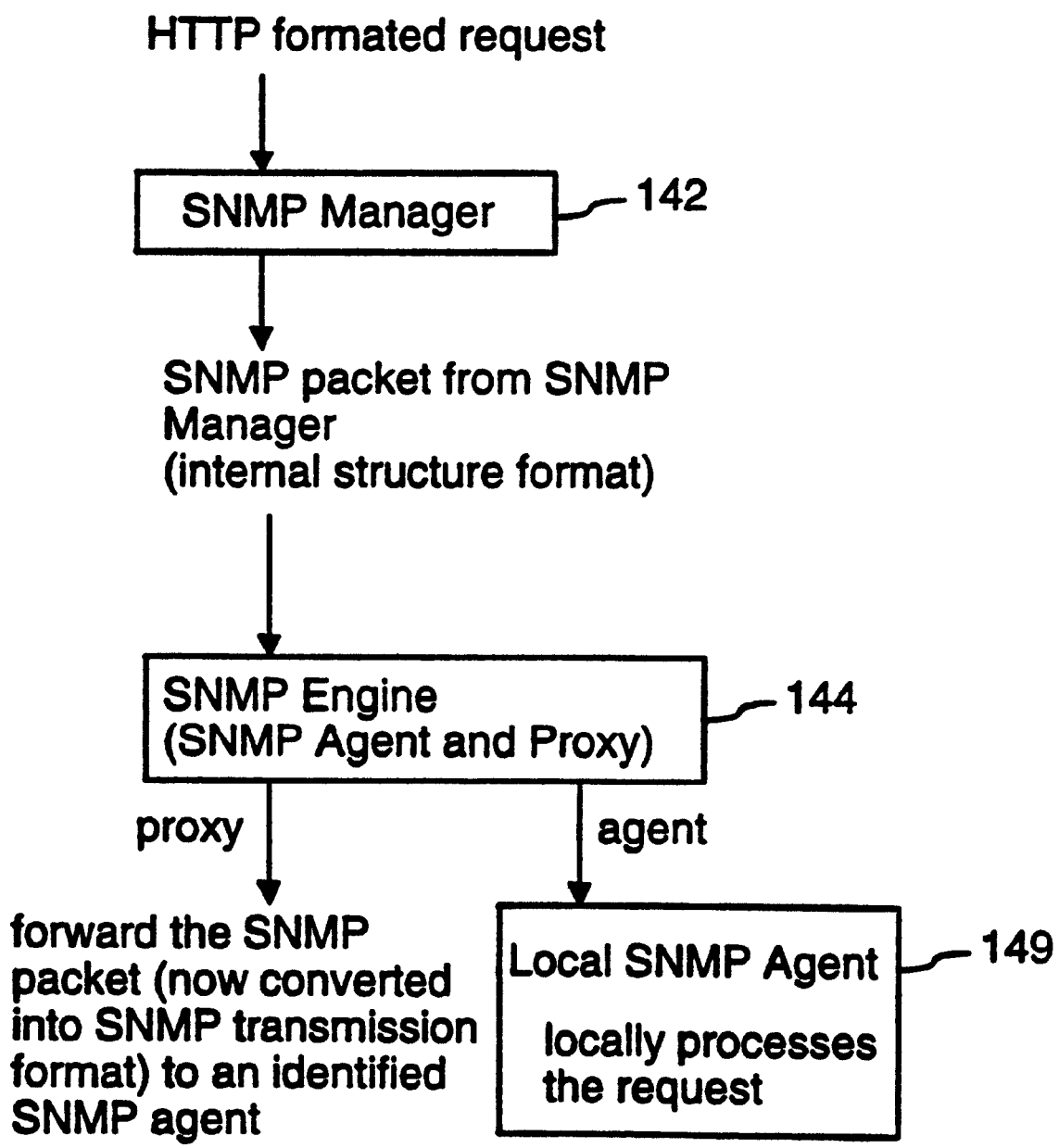
FIG. 4 depicts the conversion of device management requests, generated by a WWW browser, into an SNMP packet.
Figure 5:
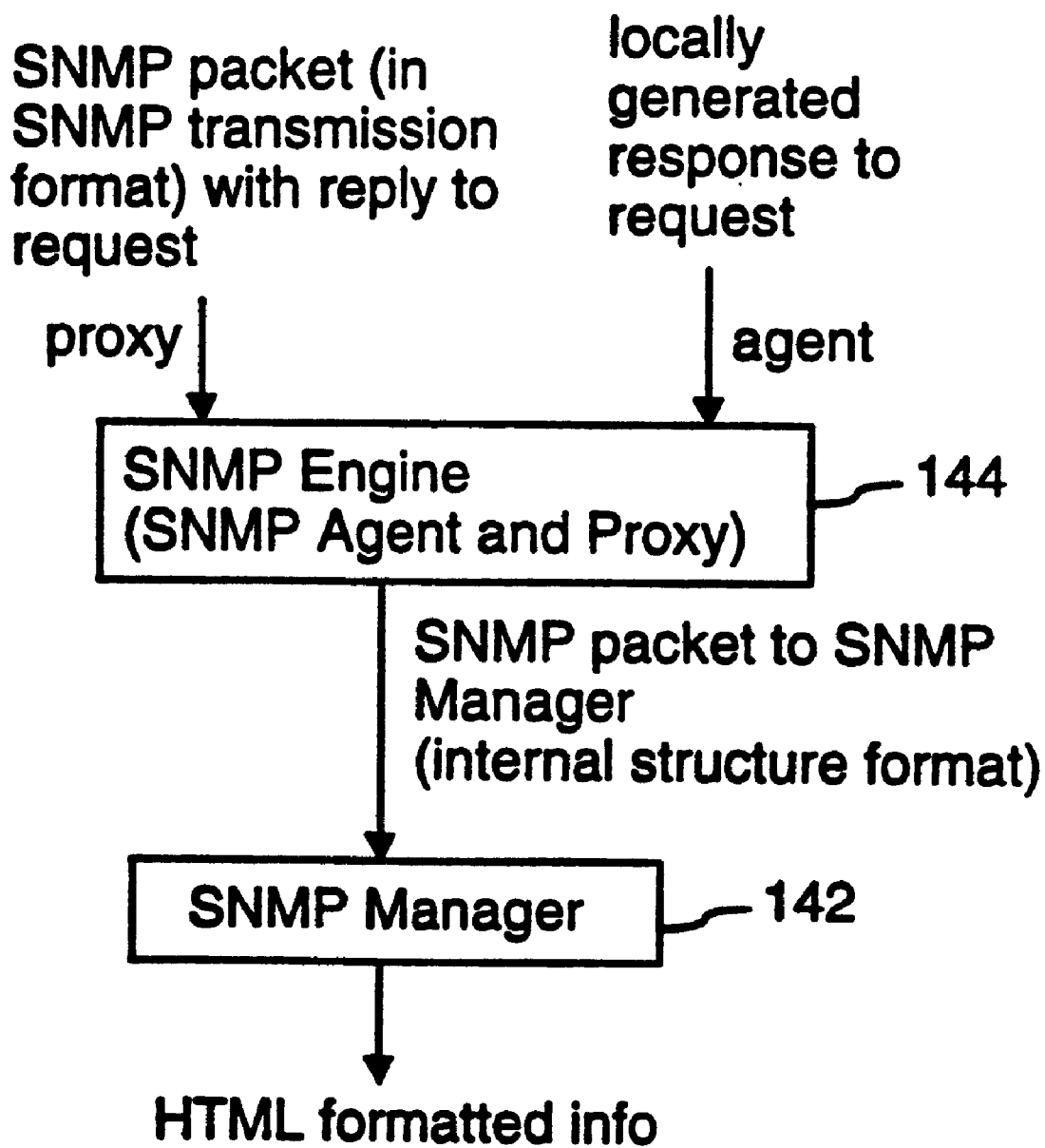
FIG. 5 depicts the conversion of an SNMP reply packet into HTML formatted information suitable for viewing with a WWW browser.

Referring to FIGS. 4 and 5, the Web proxy server, and in particular its SNMP manager 142 and SNMP engine 144 together provide HTML/HTTP based communications with the users client computer and SNMP based communications with remotely located SNMP agents. In particular, user requests for sending object data get and send requests are communicated using HTTP (hypertext transfer protocol) from the user's client computer to the Web proxy server. The SNMP manager 142 converts the HTTP formatted request into an SNMP request packet in the form of an internally used data structure. The internal data structure is then passed to the SNMP engine 144. If the request is directed to a remotely located SNMP agent, the SNMP engine acts as an SNMP proxy, converting the internal data structure representing the user request into an SNMP packet and forwarding it to the remotely located SNMP agent using conventional SNMP communication protocols. If the request is directed to a local SNMP agent 149 on the same computer or computer cluster as the Web proxy server 120 (see FIG. 1), the SNMP engine forwards the internal data structure to the local SNMP agent 149, which uses the internal data structure directly to determine what request is being made.

Referring to FIG. 5, on the return path an SNMP reply packet from a remote SNMP agent is converted by the SNMP engine 144 into an SNMP reply packet having an internal data structure, that is then passed to the SNMP manager 142, which converts the information reply into an HTML formatted document. As stated above, the HTML document representing retrieved data can either be a separate data display form, or it can be a version of the compiled MIB module with the retrieved data object values inserted therein that is created by merging the information contained in the reply packet into the previously generated HTML representation of the MIB module specification. In either case, the generated or updated HTML page is sent to the user's client computer for viewing. Locally generated reply packets, produced by a local SNMP agent are treated similarly, except that the reply packet does not need to be converted from SNMP protocol format into the internal data structure because the local SNMP agent will generally use the same internal data structures as the SNMP engine 144 and SNMP manager 142.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

TABLE 1

Web Compiler Input

TOASTER-MIB

DEFINITIONS ::= BEGIN

IMPORTS enterprises
        FROM RFC1155-SMI
        OBJECT-TYPE
        FROM RFC-1212
        DisplayString
        FROM RFC1213-MIB;

epilogue    OBJECT IDENTIFIER ::= { enterprises 12 }
toaster      OBJECT IDENTIFIER { epilogue 2 }

--toasterMIB toasterManufacturer    OBJECT-TYPE
    SYNTAX    DisplayString
    ACCESS    read-only
    STATUS    mandatory
    DESCRIPTION
        "The name of the toaster's manufacturer. For instance,
        Sunbeam."
    ::= { toaster 1 } toasterModelNumber    OBJECT-TYPE
    SYNTAX    DisplayString
    ACCESS    read-only
    STATUS    mandatory
    DESCRIPTION
        "The name of the toaster's model. For instance,
        Radiant Automatic."
    ::=    { toaster 2 }

TABLE 1-continued

Web Compiler Input

```
toasterControl    OBJECT-TYPE
    SYNTAX        INTEGER {
                  up(1),
                  down(2).
                  }
    ACCESS        read-write
    STATUS        mandatory
    DESCRIPTION
        "This variable controls the current state of the toaster.
        To begin toasting, set it to down(2). To abort toasting
        (perhaps in the event of an emergency), set it to
        up(1)."
    ::=    { toaster 3 } toasterDoneness   OBJECT-TYPE
    SYNTAX        INTEGER (1..10)
    ACCESS        read-write
    STATUS        mandatory
    DESCRIPTION
        "This variable controls how well done ensuing toast should
        be on a scale of 1 to 10. Toast made at 10 is generally
        considered unfit for human consumplion; toast made at 1
        is lightly warmed."
    ::=    { toaster 4 } toasterToastType  OBJECT-TYPE
    SYNTAX        INTEGER {
                  white-bread(1),
                  wheat-bread(2),
                  wonder-bread(3),
                  frozen-waffle(4),
                  frozen-bagel(5),
                  hash-brown(6),
                  other(7)
                  }
    ACCESS        read-write
    STATUS        mandatory
    DESCRIPTION
        "This variable informs the toaster of the type of material
        being toasted. The toaster uses this information combined
        with toasterToastDoneness to compute how long the
        material must be toasted for to achieve the desired
        doneness."
    ::=    { toaster 5 }

END
```

TABLE 2

Web Compiler Output

```
<!DOCTYPE HTML PUBLIC "-//IETF//DTD HTML 2.0 Level 1//EN">
<HTML>
<HEAD>
<TITLE>Documentation for TOASTER-MIB</TITLE>
<!--

This file was automatically generated by Epilogue Technology's
Emissary SNMP MIB Compiler, version 6.0.
This MIB documentation file was generated using the -html switch.

DO NOT MODIFY THIS FILE BY HAND.

Last build date: Thu. Sep 5 20:30:03 1996
from files:
  ../std/rfc1213.mib, ../std/rfc1215.mib, ../std/epilogue.mib,
  ../std/toaster.mib, ../std/weather.mib
limited to identifiers in module: TOASTER-MIB -->
</HEAD>
<BODY>
<H1>Table of Contents</H1>
```

TABLE 2-continued

Web Compiler Output

```
<P>Here is the smallest subtree that contains all of the OID's described
on
this page.</P>
<UL>
<LI><A HREF="RFC1155-SMI.html#RFC1155-SMI.iso">iso</A>(1)
<UL>
<LI><A HREF="RFC1155-SMI.html#RFC1155-SMI.org">org</A>(3)
<UL>
<LI><A HREF="RFC1155-SMI.html#RFC1155-SMI.dod">dod</A>(6)
<UL>
<LI><A HREF="RFC1155-SMI.html#RFC1155-SMI.internet">internet
</A>(1)
<UL>
<LI><A HREF="RFC1155-SMI.html#RFC1155-SMI.private">private
</A>(4)
<UL>
<LI><A
HREF="RFC1155-SMI.html#RFC1155-SMI.enterprises">enterprises
</A>(1)
<VL>
<LI><A
HREF="Epilogue-MIB.html#Epilogue-MIB.epilogue">epilogue</A>(12)
<UL>
<LI><A HREF="Epilogue-MIB.html#Epilogue-MIB.toaster">toaster
</A>(2)
<UL>
<LI><A
HREF="#TOASTER-MIB.toasterManufacturer">toasterManufacturer
</A>(1)
<LI><A
HREF="#TOASTER-MIB.toasterModelNumber">toasterModelNumber
</A>(2)
<LI><A HREF="#TOASTER-MIB.toasterControl">toasterControl</A>(3)
<LI><A HREF="#TOASTER-MIB.toasterDoneness">toasterDoneness
</A>(4)
<LI><A
HREF="#TOASTER-MIB.toasterToastType">toasterToastType</A>(5)
</UL>
</UL>
</UL>
</UL>
</UL>
</UL>
</UL>
</UL>
</UL>
<HR>
<H1><A NAME="1.3.6.1.4.1.12.2.1"></A><A
NAME="TOASTER-MIB.toasterManufacturer"></A>toasterManufacturer
</H1>
<P>Module: TOASTER-MIB<BR>
Value: <A HREF="Epilogue-MIB.html#Epilogue-MIB.toaster">toaster
</A>.1
(1.3.6.1.4.1.12.2.1)<BR>
Access: read-only<BR>
Status: mandatory<BR>
<BR>This is a scalar variable.<BR>
Syntax: <A
HREF="RFC1213-MIB.html#RFC1213-MIB.DisplayString">Display
String</A>
<BR>
<A
HREF="view-scalar? 0=s0M,I4.1.12.2.1,TOASTER-MIB.toaster
Manufacturer,1;=S0s,RFC1213-MIB.DisplayString">[View Scalar]</A>
<BR>
<BLOCKQUOTE><PRE>The name of the toaster's manufacturer. For
instance,
Sunbeam.</PRE></BLOCKQUOTE>
</P>
<HR>
<H1><A NAME="1.3.6.1.4.1.1 2.2.2"></A><A
NAME="TOASTER-MIB.toasterModelNumber"></A>toasterModel
Number</H1>
<P>Module: TOASTER-MIB<BR>
Value: <A HREF="Epilogue-MIB.html#Epilogue-MIB.toaster">toaster
</A>.2
(1.3.6.1.4.1.12.2.2)<BR>
```

TABLE 2-continued

Web Compiler Output

Access: read only<BR>
Status: matidatory<BR>
<BR>This is a scalar variable.<BR>
Syntax: <A
HREF="RFC1213 MIB.html#RFC1213-MIB.DisplayString">Display
String</A>
<BR>
<A
HREF="view-scalar?0=s0M,I4.1.12.2.2,TOASTER-MIB.toasterModel
Number,1;1=S0s,RFC1213-MIB.DisplayString">[View Scalar]</A><BR>
<BLOCKQUOTE><PRE>The name of the toaster's model. For instance,
Radiant Automatic.</PRE></BLOCKQUOTE>
</P>
<HR>
<H1><A NAME="1.3.6.1.4.1.12.2.3"></A><A
NAME="TOASTER-MIB.toasterControl"></A>toasterControl</H1>
<P>Module: TOASTER-MIB<BR>
Value: <A HREF="Epilogue-MIB.html#Epilogue-MIB.toaster">toaster
</A>.3
(1.3.6.1.4.1.12.2.3)<BR>
Access: read-write<BR>
Status: mandatory<BR>
<BR>This is a scalar variable.<BR>
Syntax: INTEGER {<UL><LI>up(1),<LI>down (2)</UL>}<BR>
<A
HREF="view-scalar?0=e0Mw,I4.1.12.2.3,TOASTER-MIB.toasterControl,
1;1=E0i,,,up,down">[View Scalar]</A><BR>
<BLOCKQUOTE><PRE>This variable controls the current state of the
toaster.
To begin toasting, set it to down(2). To abort toasting
(perhaps in the event of an emergency), set it to
up(1).</PRE></BLOCKQUOTE>
</P>
<HR>
<H1><A NAME="1.3.6.1.4.1.12.2.4"></A><A
NAME="TOASTER-MIB.toasterDoneness"></A>toasterDoneness</H1>
<P>Module: TOASTER-MIB<BR>
Value: <A HREF="Epilogue-MIB.html#Epilogue-MIB.toaster">toaster
</A>.4
(1.3.6.1.4.1.12.2.4)<BR>
Access: read-write<BR>
Status: mandatory<BR>
<BR>This is a scalar variable.<BR>
Syntax: INTEGER (1..10)<BR>
<A
HREF="view-scalar?0=i0Mw,I4.1.12.2.4,TOASTER-MIB.toaster
Doneness,1;1=R0i,,,1,10">[View Scalar]</A><BR>
<BLOCKQUOTE><PRE>This variable controls how well done ensuing
toast should be
on a scale of 1 to 10. Toast made at 10 is generally
considered unfit for human consumption; toast made at 1
is lightly warmed.</PRE></BLOCKQUOTE>
</P>
<HR>
<H1><A NAME="1.3.6.1.4.1.12.2.5"></A><A
NAME="TOASTER-MIB.toasterToastType"></A>toasterToastType
</H 1>
<P>Module: TOASTER-MIB<BR>
Value: <A HREF="Epilogue-MIB.html#Epilogue-MIB.toaster">toaster
</A>.5
(1.3.6.1.4.1.12.2.5)<BR>
Access: read-write<BR>
Status: mandatory<BR>
<BR>This is a scalar variable.<BR>
Syntax: INTEGER
{<UL><LI>white-bread(1),<LI>wheat-bread(2),<LI>wonder-bread(3),
<LI>frozen-waffle(4),<LI>frozen-bagel(5),<LI>hashbrown(6)1<LI>
other(7)</UL>)<BR>
<A
H REF="view-scalar?0=e0Mw,I4.1.12.2.5,TOASTER-MIB.toasterToast
Type,1;1=E0i,,,white-bread,wheat-bread,wonder-bread,frozen-waffle,
frozen-bagel,hash-brown,other">[View Scalar]</A><BR>
<BLOCKQUOTE><PRE>This variable informs the toaster of the type of
material being toasted. The toaster uses this information combined
with toasterToastDoneness to compute how long the
material must be toasted for to achieve the desired
doneness.</PRE></BLOCKQUOTE>

TABLE 2-continued

Web Compiler Output

</P>
<HR>
<P>This page was generated by <A
HREF="http://www.epilogue.com/">Epilogue Technology</A>'s
Emissary
SNMP MIB Compiler; version 6.0.</P>
</BODY>
</HTML>

What is claimed is:

1. Apparatus for facilitating management of SNMP-manageable devices, comprising:

a World Wide Web server for receiving user requests from users at locations remote to the Web server, a first subset of said user requests specifying an SNMP agent to be managed, and a second subset of said user requests indicating specific SNMP operations to be performed with respect to a specified SNMP agent;

said Web server including:

a MIB module information locator for locating, for said user specified SNMP agent, at least one associated MIB module specification by accessing a domain name system (DNS);

a MIB compiler for converting said located MIB module specification into an HTML formatted MIB module specification, and for transferring a copy of said HTML formatted MIB module specification to a respective user associated with the user request that specified said SNMP agent with which said MIB module specification is associated;

said HTML formatted MIB module specification including one or more HTML formatted forms for displaying data values retrieved from a MIB module associated with the user specified SNMP agent and for entering user requests in the second subset of user requests; and a SNMP management module for converting each said user request indicating one or more specific SNMP operations to be performed with respect to a specified SNMP agent into one or more corresponding SNMP request packets for transmission to said specified SNMP agent, and for converting SNMP reply packets received from said specified SNMP agent into HTML formatted reply documents for transmission to said user.

2. The apparatus of claim 1, wherein said MIB module information locator is configured to convert a MIB module object identifier associated with said user specified SNMP agent into a domain name system (DNS) name, and for then utilizing said DNS name to access an associated resource record that contains information indicating an Internet accessible location at which said associated MIB module specification is stored.

3. A method of facilitating management of SNMP-manageable devices, comprising the steps of:

receiving user requests from users, a first subset of the user requests specifying an SNMP agent to be managed, and a second subset of the user requests indicating specific SNMP operations to be performed with respect to a specified SNMP agent;

locating, for the user specified SNMP agent, at least one associated MIB module specification by accessing a domain name system (DNS);

converting the located MIB module specification into an HTML formatted MIB module specification, and for transferring a copy of the HTML formatted MIB module specification to a respective user associated with the user request that specified the SNMP agent with which the MIB module specification is associated; said HTML formatted MIB module specification including one or more HTML formatted forms for displaying data values retrieved from a MIB module associated with the user specified SNMP agent and for entering user requests in the second subset of user requests;

converting each user request indicating one or more specific SNMP operations to be performed with respect to a specified SNMP agent into one or more corresponding SNMP request packets for transmission to the specified SNMP agent; and converting SNMP reply packets received from the specified SNMP agent into HTML formatted reply documents for transmission to the user.

4. The method of claim 3, the MIB module specification locating step including:

converting a MIB module object identifier associated with the user specified SNMP agent into a domain name system (DNS) name, and then utilizing the DNS name to access an associated resource record that contains information indicating an Internet accessible location at which the associated MIB module specification is stored.

5. A computer program product for facilitating management of SNMP-manageable devices, the computer program product for use in conjunction with a computer system that receives user requests from users, a first subset of the user requests specifying an SNMP agent to be managed, and a second subset of the user requests indicating specific SNMP operations to be performed with respect to a specified SNMP agent; the computer program product comprising a computer readable storage medium and a computer program mechanism embedded therein, the computer program mechanism comprising:

a MIB module information locator for locating, for the user specified SNMP agent, at least one associated MIB module specification by accessing a domain name system (DNS);

a MIB compiler for converting the located MIB module specification into an HTML formatted MIB module specification, and for transferring a copy of the HTML formatted MIB module specification to a respective user associated with the user request that specified the SNMP agent with which the MIB module specification is associated; said HTML formatted MIB module specification including one or more HTML formatted forms for displaying data values retrieved from a MIB module associated with the user specified SNMP agent and for entering user requests in the second subset of user requests; and a SNMP management module for converting each user request indicating one or more specific SNMP operations to be performed with respect to a specified SNMP agent into one or more corresponding SNMP request packets for transmission to the specified SNMP agent, and for converting SNMP reply packets received from the specified SNMP agent into HTML formatted reply documents for transmission to the user.

6. The computer program product of claim 5, wherein the MIB module information locator is configured to convert a MIB module object identifier associated with the user specified SNMP agent into a domain name system (DNS) name, and for then utilizing the DNS name to access an associated resource record that contains information indicating an Internet accessible location at which the associated MIB module specification is stored.

* * * * *